United States Patent
Kim et al.

(10) Patent No.: US 10,373,573 B2
(45) Date of Patent: Aug. 6, 2019

(54) DISPLAY DEVICE AND DATA COMPENSATING METHOD THEREOF

(71) Applicant: LG Display Co., Ltd., Seoul (KR)

(72) Inventors: YoungKyung Kim, Busan (KR); JoungTae Kim, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/708,964

(22) Filed: Sep. 19, 2017

(65) Prior Publication Data

US 2018/0151135 A1   May 31, 2018

(30) Foreign Application Priority Data

Nov. 30, 2016   (KR) .................. 10-2016-0161988

(51) Int. Cl.
*G09G 5/10* (2006.01)
*G09G 3/36* (2006.01)
*F21V 8/00* (2006.01)

(52) U.S. Cl.
CPC ......... *G09G 3/3607* (2013.01); *G02B 6/0051* (2013.01); *G02B 6/0053* (2013.01); *G02B 6/0091* (2013.01); *G09G 2310/08* (2013.01); *G09G 2320/041* (2013.01); *G09G 2320/0666* (2013.01); *G09G 2320/08* (2013.01)

(58) Field of Classification Search
CPC .................. G09G 3/2003; G02F 1/133514
See application file for complete search history.

(56) References Cited

U.S. PATENT DOCUMENTS

| 2007/0024609 A1* | 2/2007 | Lee ...................... G09G 3/2059 345/208 |
| 2015/0355399 A1* | 12/2015 | You ........................ G02B 6/005 349/65 |
| 2016/0306090 A1* | 10/2016 | Pu .......................... G02B 6/004 |

\* cited by examiner

*Primary Examiner* — Nan-Ying Yang
(74) *Attorney, Agent, or Firm* — Seed IP Law Group LLP

(57) ABSTRACT

A display device and a data compensating method thereof are disclosed. The display device includes: a liquid crystal display panel having a plurality of pixels; a color temperature compensation unit configured to determine a color temperature at each position of a light guide plate using a thermal conductivity of the light guide plate and a color temperature at a reference position of the light guide plate, and determine a color temperature compensation value at positions of the light guide plate using the color temperature; and a timing controller configured to correct at least one of an R gain value and a B gain value of the image data using the color temperature compensation value.

18 Claims, 5 Drawing Sheets

DISPLAY DEVICE AND DATA COMPENSATING METHOD THEREOF

CROSS-REFERENCE TO RELATED APPLICATIONS

This application claims priority from Korean Patent Application No. 10-2016-0161988, filed on Nov. 30, 2016, which is hereby incorporated by reference for all purposes as if fully set forth herein.

BACKGROUND

Technical Field

The present disclosure relates to a display device and a data compensating method thereof.

Discussion of the Related Art

In general, a liquid crystal display device is an example of flat panel displays capable of displaying images using the electric and optical properties of a liquid crystal having intermediate properties between liquids and solids. The liquid crystal display device is thinner and lighter than other display devices, and also has a lower driving voltage and lower power consumption as compared to such display devices. Thus, the liquid crystal display device has been variously applied and used throughout the industry.

Meanwhile, the liquid crystal display device is a non-emissive element that emits light depending on an external factor and thus requires a separate light source. Therefore, a backlight unit including a light source is provided on a back surface of a liquid crystal panel and configured to irradiate light toward a front surface of the liquid crystal display device. The light is diffused while passing through a plurality of optical sheets, and then condensed by the liquid crystal panel. Thus, an identifiable image can be achieved.

In general, backlight units can be divided into an edge-type backlight unit and a direct-type backlight unit depending on a position of a light emitting lamp serving as a light source in the liquid crystal display device.

The direct-type backlight unit has a structure in which a plurality of lamps is disposed on a back surface of a liquid crystal display panel and directly irradiates light to a front surface of the liquid crystal display panel. The edge-type backlight unit has a structure in which a light source is disposed outside a light guide plate that guides light and light emitted from the light source is incident into the entire surface of the liquid crystal display panel by the transparent light guide plate. In recent years, the edge-type backlight unit has been mainly used due to excellent durability and advantages, such as lightening and thinning, of the liquid crystal display device.

Meanwhile, the light guide plate may be formed of a transparent material, for example, glass. However, glass has a low thermal conductivity. Therefore, if the light guide plate is formed of glass, a region adjacent to a lamp may increase in temperature due to heat from the lamp and a region distant from the lamp may have a relatively low temperature. Such a difference in temperature of the light guide plate may cause a color difference, and, thus, a high-temperature region has a red color and a low-temperature region has a green color.

In order to compensate a color difference, a white balance control method as a color temperature correction technology has been conventionally used. However, according to the white balance control method, all of red (R), green (G), blue (B) gains are controlled, and, thus, the amount of compensation data to be calculated for compensation is relatively large. Also, green (G) components account for 80% of luminance components, and, thus, when a gain of the green (G) components is controlled, the luminance may be affected. Therefore, the gain control is very limited.

BRIEF SUMMARY

An aspect of the present disclosure provides a display device that can compensate a color temperature difference of a light guide plate more simply and efficiently and a data compensating method thereof.

According to an aspect of the present disclosure, there is provided a display device. The display device includes a liquid crystal display panel that may include a plurality of pixels. The display device includes a light guide plate which may include a plurality of positions and transmit light from a light source to the liquid crystal display panel, may have a thermal conductivity and a reference position. The display device may include a color temperature compensation unit configured to determine a color temperature at one or more positions of the light guide plate using the thermal conductivity of the light guide plate and a color temperature at the reference position of the light guide plate, and determine, such as by calculating, a color temperature compensation value at each of the one or more positions of the light guide plate based at least in part on the color temperature. The display device may include a timing controller configured to correct at least one of an R gain value and a B gain value of image data displayed in at least one of the plurality of pixels based at least in part on the color temperature compensation value.

According to another aspect of the present invention, there is provided a data compensating method of a display device. The data compensating method of a display device includes determining a color temperature at each position of a light guide plate using a thermal conductivity of the light guide plate that transmits light from a light source to a liquid crystal display panel and a color temperature at a reference position of the light guide plate. The data compensating method of a display device includes determining a color temperature compensation value at one or more positions of the light guide plate using a difference in color temperature between the reference position and each of the one or more positions. The data compensating method of a display device includes correcting at least one of an R gain value and a B gain value of image data displayed in at least one of the plurality of pixels based at least in part on the color temperature compensation value.

According to the present exemplary embodiments described above, it is possible to calculate a color temperature compensation value using values set when designing and assembling a light guide plate. Thus, it is possible to simplify a process of calculating a color temperature compensation value and compensating a color temperature.

Further, according to the present exemplary embodiments described above, it is possible to remove reddish and greenish phenomena using only an R gain and a B gain. Thus, it is not necessary to adjust a G gain. Therefore, it is possible to suppress loss caused by a change in luminance occurring when a color temperature is compensated.

BRIEF DESCRIPTION OF THE DRAWINGS

The above and other aspects, features and other advantages of the present disclosure will be more clearly under

DETAILED DESCRIPTION

Figure 1:
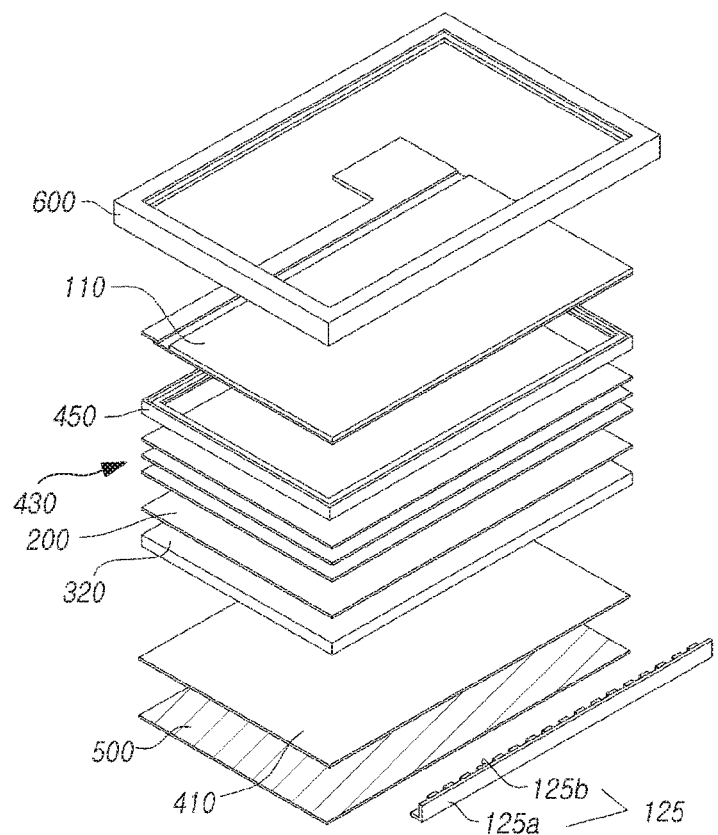
- FIG. 1 is an exploded perspective view schematically illustrating a structure of a display device according to the present exemplary embodiment.

Hereinafter, exemplary embodiments of the present disclosure will be described in detail with reference to the accompanying drawings. The exemplary embodiments introduced hereinafter are provided as examples for a person having ordinary skill in the art. Therefore, the present disclosure is not limited to the following exemplary embodiments and can be embodied in a different form. Also, the size and thickness of the device may be expressed to be exaggerated for the sake of convenience in the drawings. Like reference numerals generally denote like elements throughout the present specification.

Advantages and features of the present disclosure, and methods for accomplishing the same will be more clearly understood from exemplary embodiments described below with reference to the accompanying drawings. However, the present disclosure is not limited to the following exemplary embodiments but may be implemented in various different forms. The exemplary embodiments are provided only to complete disclosure of the present disclosure and to fully provide a person having ordinary skill in the art to which the present disclosure pertains with the category of the disclosure, and the present disclosure will be defined by the appended claims. Like reference numerals generally denote like elements throughout the present specification. In the drawings, the sizes and relative sizes of layers and regions may be exaggerated for clarity.

When an element or layer is referred to as being "on" another element or layer, it may be directly on the other element or layer, or intervening elements or layers may be present. Meanwhile, when an element is referred to as being "directly on" another element, any intervening elements may not be present.

The spatially-relative terms such as "below," "beneath," "lower," "above," and "upper," may be used herein for ease of description to describe the relationship of one element or components with another element(s) or component(s) as illustrated in the drawings. It will be understood that the spatially relative terms are intended to encompass different orientations of the element in use or operation, in addition to the orientation depicted in the drawings. For example, if the element in the drawings is turned over, elements described as "below" or "beneath" other elements would then be oriented "above" the other elements. Thus, the exemplary term "below" can encompass both an orientation of above and below.

Further, in describing components of the present disclosure, terms such as first, second, A, B, (a), and (b), can be used. These terms are used only to differentiate the components from other components. Therefore, the nature, order, sequence, or number of the corresponding components is not limited by these terms.

FIG. 1 is an exploded perspective view schematically illustrating a structure of a display device according to the present exemplary embodiment.

Referring to FIG. 1, a display device according to the present exemplary embodiment may include a display panel 110, a backlight unit provided on a back surface of the display panel 110 and configured to emit light to a front surface of the display panel 110, and a panel guide 450 configured to accommodate and fix the display panel 110 and the backlight unit therein.

The display panel 110 may be a liquid crystal display panel. Although not illustrated in the drawings, a color filter array substrate and a thin film transistor array substrate disposed facing each other may be included in the display panel 110, and a liquid crystal layer interposed between the color filter array substrate and the thin film transistor (TFT) array substrate may be included.

The display panel 110 may be formed by bonding the color filter array substrate and the TFT array substrate, and a common electrode and a pixel electrode may be formed so as to apply an electric field to the liquid crystal layer. A voltage of a data signal may be applied to the pixel electrode and controlled in such a state compared to a voltage applied to the common electrode, such that a liquid crystal in the liquid crystal layer may be rotated by dielectric anisotropy along the electric field between the common electrode and the pixel electrode. Thus, light is transmitted or blocked by each pixel so as to display a text or image.

To control a voltage of a data signal to be applied to the pixel electrode in each pixel, a switching element such as a thin film transistor is provided for each pixel. An upper polarizing plate and a lower polarizing plate (not illustrated) may be attached to each outside of the display panel 110. The lower polarizing plate polarizes light passing through the backlight unit, and the upper polarizing plate polarizes light passing through the display panel 110.

In some implementations, the backlight unit may include a light source assembly 125 including a light source array 125b that generates light on at least one side of a light guide plate 320, a reflecting plate 410 on a back surface of the light guide plate 320, and a plurality of optical sheets 430 disposed on an upper surface of the light guide plate 320. Herein, the light source may be a light emitting diode (LED), but the present exemplary embodiment is not limited thereto. The display panel 110 is mounted on an upper part of the backlight unit through the panel guide 450. The display panel 110, the panel guide 450, and the backlight unit are physically coupled to each other by a lower cover bottom 500 and an upper case top 600 through a fixing member and thus constitute the display device.

The plurality of optical sheets 430 may include a diffusion sheet, upper and lower prism sheets, and a protection sheet. The diffusion sheet may disperse light incident from the light guide plate 320 and refract the incident light at a vertical angle. As such, the light guide plate 320 may suppress the generation of spots on an image displayed on the display panel 110 caused by partial concentration of light. In one embodiment, may also refract light incident from the light guide plate 320 at a vertical angle. The upper and lower prism sheets may condense light incident from the diffusion sheet and uniformly distribute the light to the surface of the display panel 110. The protection sheet may protect the optical sheets 430 which are sensitive to dust or scratch, and may suppress the movement of the optical sheets 430 when the backlight unit is transported.

The light source assembly 125 may include the light source array 125b and a light source printed circuit board (PCB, not illustrated) configured to drive the light source array 125b. A plurality of light sources 125a may be provided and may be equi-spaced on the light source PCB.

The light source assembly 125 is mounted in a light source housing (not illustrated). The light source housing protects the light source assembly and concentrate light emitted from the plurality of light sources 125a toward the light guide plate 320, and thus suppress light loss. Further, the light source housing may improve the heat dissipation effect of the light source assembly.

The light emitted from the light source array 125b may be incident to a lateral surface of the light guide plate 320, and the reflecting plate 410 disposed on the back surface of the light guide plate 320 reflects light transmitted through the back surface of the light guide plate 320 towards the upper surface of the light guide plate 320 so as to be emitted toward the display panel 110.

The light guide plate 320 may be formed of a transparent material, for example, glass. Since the light guide plate 320 is formed of a transparent material, the light transmittance can be improved.

Figure 2:
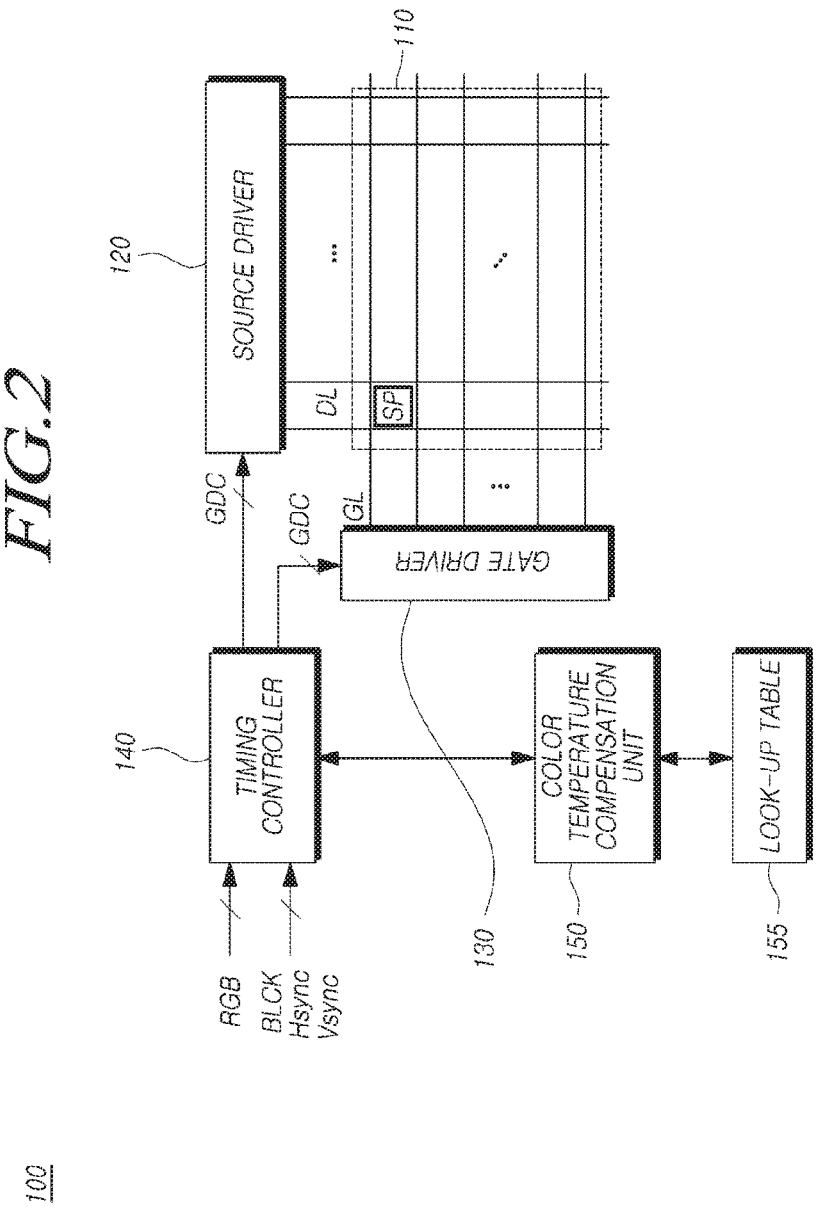
FIG. 2 is a schematic system configuration view of the display device of FIG. 1.

FIG. 2 is a schematic system configuration view of the display device of FIG. 1.

Referring to FIG. 2, in a display panel 110, a plurality of data lines DL and a plurality of gate lines GL are disposed, and a plurality of sub pixels SP constituting a single pixel is disposed in matrix type at intersections between the data lines DL and the gate lines GL.

A source driver 120 configured to drive the plurality of data lines DL and a gate driver 130 configured to drive the plurality of gate lines GL may be provided on an upper end and/or a lower end of the display panel 110. The source driver 120 and the gate driver 130 are controlled by a timing controller 140.

The gate driver 130 may sequentially drive the components electrically coupled to each of the plurality of gate lines GL by sequentially supplying a scan signal to each of the plurality of gate lines GL. The sequential supplying of the scan signal may be under the control of the timing controller 140.

If the gate lines are opened in response to a specific scan signal, the source driver 120 may convert image data Data received from the timing controller 140 into a data voltage Vdata of an analog form and supply the data voltage Vdata to the plurality of data lines DL to drive the components (e.g., the sub-pixels) electrically coupled to one or more of the plurality of data lines DL.

The timing controller 140 converts input image data RGB input from the outside to be suitable for a data signal form used by the source driver 120 and outputs the converted image data Data. Further, the timing controller 140 receives timing signals, such as a vertical synchronization signal Vsync, a horizontal synchronization signal Hsync, an input DE signal, and a clock signal BLCK, generates various control signals, and outputs the control signals to the source driver 120 and the gate driver 130 in order to control the source driver 120 and the gate driver 130.

The timing controller 140 may correct image data using a color temperature compensation value for compensating a color difference of the light guide plate 320. When a color temperature is compensated, the timing controller 140 may correct gain values of red (R) and/or blue (B) among RGB. The timing controller 140 may correct both the R gain value and B gain value or may compensate only one of the R gain value and the B gain value depending on whether the color temperature is high or low. Details thereof will be described later.

A color temperature compensation unit 150 may calculate a color temperature compensation value to be used for color temperature compensation performed by the timing controller 140. The color temperature compensation unit 150 may calculate a color temperature compensation value at each position Y on the light guide plate 320 based at least in part on a distance d between the light source array 125b and the light guide plate 320, and a thermal conductivity ε of the light guide plate 320.

Hereinafter, the distance d between the light source array 125b and the light guide plate 320 and the position Y on the light guide plate 320 will be described with reference to FIG. 3.

Figure 3:
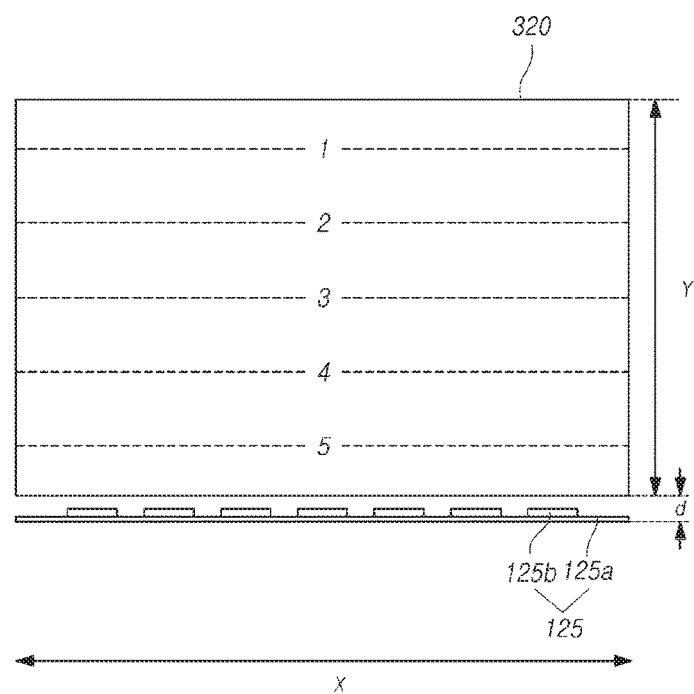
FIG. 3 is a front view of a light guide plate according to the present exemplary embodiment.

FIG. 3 illustrates the light guide plate 320 and the light source assembly 125, in which the light source assembly 125 extends along a lateral surface of the light guide plate 320 in a direction X. In the light source assembly 125, the light source 125a is disposed facing the light guide plate 320. Herein, the distance between the light guide plate 320 and the light source array 125b is the distance d.

The light guide plate 320 may extend in a direction perpendicular to a direction of the light source array 125b, i.e., on a line that extends from an edge of the light guide plate 320 adjacent the light source array 125b towards a counter edge, and that is referred to as Y. FIG. 3 illustrates various levels along Y, from 1 to 5, so as to be linked to the graph of FIG. 4. Herein, as Y goes from level 5 to level 1, the positions along the light guide plate 320 become more distant from the light source array 125b, in which level 3 denotes the center along a direction Y of the light guide plate 320.

In the light guide plate 320 in FIG. 3, each position within a central area of the light guide plate 320 along level 3 is the same distance from the light source array 125b. Thus, each such position along level 3 may have the same temperature and the same color temperature. Likewise, positions within an area that extends along level 1 may have the same temperature and the same color temperature. Herein, a color temperature and a temperature are inversely proportional to each other. That is, as the temperature increases, the color temperature decreases, and as the temperature decreases, the color temperature increases.

The area denoted by level 1 is more distant from the light source than an area denoted by level 5 or the area denoted by level 3. Thus, the portion of the light guide plate 320 along and adjacent to level 1 may have a relatively low temperature and a relatively high color temperature when compared to the portions of the light guide plate 320 located along level 5 or level 3. Therefore, the area of the light guide plate 320 that extends along level 1 may have a relatively high green (G) gain and appear greenish. Likewise, the portion of the light guide plate 320 extending along and adjacent to level 5 may have a higher temperature and a lower color temperature than the portion of the light guide plate 320 extending along or adjacent to level 3 or level 1. Therefore, the portion of the light guide plate 320 extending along or adjacent to level 5 may have a relatively high red (R) gain and appear reddish compared to other portions of the light guide plate 320.

Figure 4:
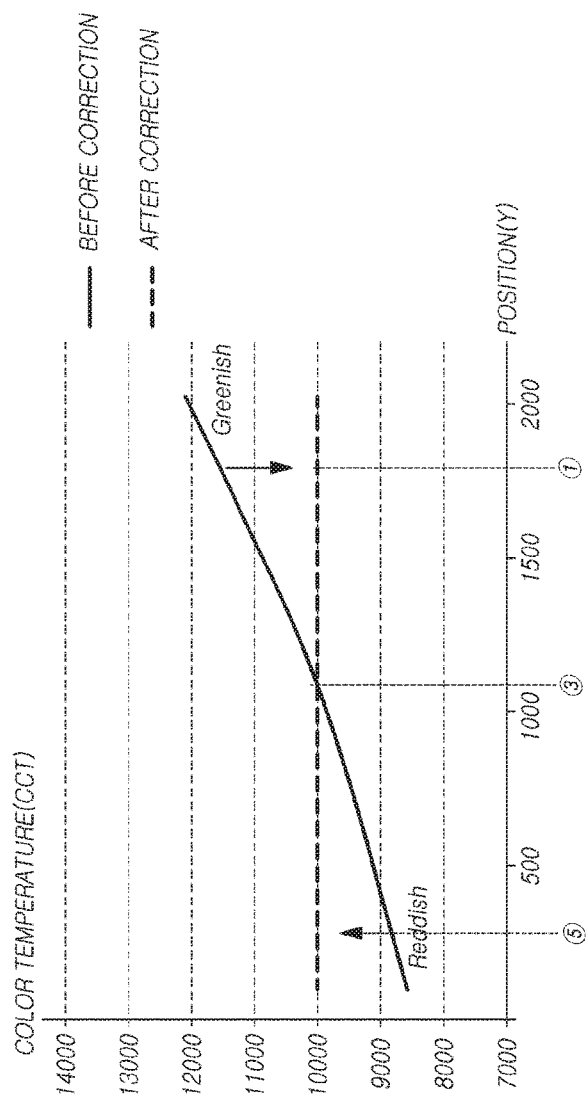
FIG. 4 is a graph illustrating a color temperature at each position of the light guide plate according to the present exemplary embodiment.

As can be seen from the graph of FIG. 4 illustrating the relationship between the color temperature and the position or level Y of the light guide plate 320, when the position Y of the light guide plate 320 goes from a position adjacent to the light source array 125*b* to a position distant from the light source array 125*b*, the color temperature is gradually increased. That is, with respect to the center of the light guide plate 320 denoted by level 3, a position adjacent to the light source array 125*b* is more reddish and a position distant from the light source array 125*b* is more greenish.

When an R gain is decreased to increase a color temperature of an area of the light guide plate 320 adjacent to the light source array 125*b*, such as at a portion of the light guide plate 320 adjacent to level 5 in FIG. 3, a reddish phenomenon can be removed. Also, when an R gain and a B gain are increased to decrease a color temperature of an area of the light guide plate 320 distant from the light source array 125*b*, such as at a portion of the light guide plate 320 adjacent to level 1 in FIG. 3, a greenish phenomenon can be removed. If correction is performed as such, the color temperature may become uniform, or substantially uniform, throughout the entire area of the light guide plate 320 as illustrated in FIG. 3. Thus, a greenish phenomenon and/or reddish phenomenon can be limited or even removed from each of the various levels of the light guide plate 320.

In some implementations, the central area of the light guide plate 320 may not be greenish or reddish. This is because the center of the light guide plate 320 is designed to have a selected color temperature, which is practice will be equal to or close to an optimum color temperature when the light guide plate 320 is designed. Therefore, the color temperature compensation unit 150 calculates, or otherwise determines, a color temperature compensation value based at least in part on the color temperature occurring at the center of the light guide plate 320.

In this case, the color temperature compensation unit 150 may use the distance d between the light source array 125*b* and the light guide plate 320, the position Y on the light guide plate 320, and the thermal conductivity ε of the light guide plate 320 to determine an appropriate color temperature compensation value. The relationship between the color temperature and each factor will be described below.

As for the distance d between the light source array 125*b* and the light guide plate 320, as the distance d between the light source array 125*b* and the light guide plate 320 is increased, the amount of heat transferred from the light source array 125*b* to the light guide plate 320 is decreased. Thus, the color temperature of the light guide plate 320 is generally increased as the distance d is increased. Therefore, an increased portion of the light guide plate 320 may receive a relative increase of an R gain value and a B gain value from the color temperature compensation unit 150. Therefore, if the distance d between the light source array 125*b* and the light guide plate 320 is considered, it is possible to calculate a color temperature compensation value more accurately.

As for the thermal conductivity ε of the light guide plate 320, as the thermal conductivity ε is increased, the temperature of the light guide plate 320 is generally increased. Therefore, a reddish area may be increased. Therefore, an increased portion of the light guide plate 320 may receive a relative decrease of an R gain value from the color temperature compensation unit 150. If the thermal conductivity ε of the light guide plate 320 is considered, it is possible to calculate a color temperature compensation value more accurately.

As for the position Y on the light guide plate 320, Y indicates the distance of a position on the light guide plate 320 from the center of the light guide plate 320. Therefore, it is possible to calculate a relative increase or decrease for an R gain value and/or a B gain value based on the distance.

If the distance along Y of a position on the light guide plate 320 is considered, it is possible to calculate a color temperature compensation value more accurately.

Therefore, the color temperature compensation unit 150 may be used to determine, such as by calculating, a color temperature compensation value for compensation at one or more positions on the light guide plate 320 based at least in part on the distance d between the light source array 125*b* and the light guide plate 320, the position Y on the light guide plate 320, the thermal conductivity ε of the light guide plate 320, and a color temperature at the center which is the reference position of the light guide plate 320.

Herein, an area of the light guide plate 320 adjacent to the light source array 125*b* has a high temperature and a low color temperature, and, thus, the color temperature compensation unit 150 determines, such as by calculating, an R gain compensation value to increase the color temperature, i.e., decrease the R gain. An area of the light guide plate 320 distant from the light source array 125*b* has a low temperature and a high color temperature, and, thus, the color temperature compensation unit 150 calculates, or determines by other acceptable technique a R gain compensation value and a B gain compensation value to decrease the color temperature, i.e., increase the R gain and the B gain.

The color temperature compensation value associated with a position on the light guide plate 320 and determined by the color temperature compensation unit 150 may be stored in a look-up table 155. Herein, the look-up table 155 may store information about each position or level Y on the light guide plate 320, including the color temperature compensation value associated with each level Y. The look-up table 155 may match the Y level for one or more positions along the light guide plate 320 with an associated color temperature compensation value.

The color temperature compensation unit 150 may provide an R gain compensation value and/or a B gain compensation value, which are color temperature compensation values for each pixel, and cause the color temperature compensation values to be associated with each pixel and stored in the look-up table 155 to the timing controller 140.

When image data are input to the timing controller 140, the timing controller 140 may compensate an RGB gain value for each pixel of the image data using the R gain compensation value and/or the B gain compensation value provided from the color temperature compensation unit 150 and then provide the compensated image data to the source driver 120.

Figure 5:
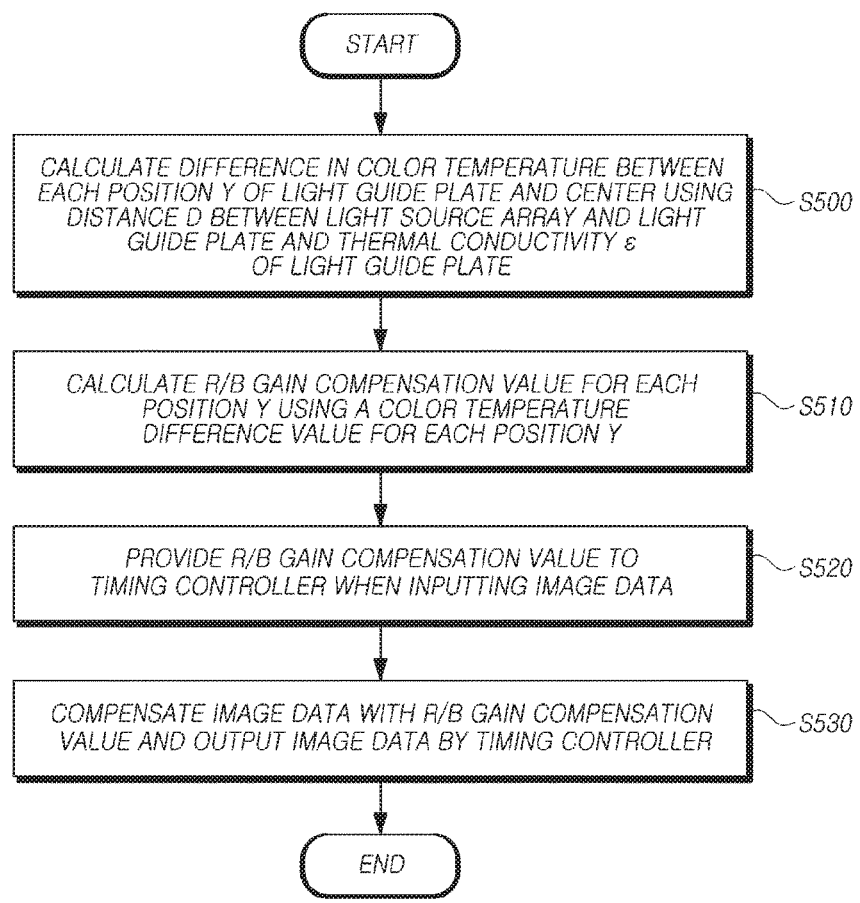
FIG. 5 is a flowchart illustrating a process of compensating a difference in color temperature of the light guide plate in the display device according to the present exemplary embodiment.

Hereinafter, a process of compensating a difference in color temperature of the light guide plate 320 in the display device configured as described above will be described with reference to FIG. 5.

The color temperature compensation unit 150 may receive information about a color temperature at the center of the light guide plate 320, an R gain value and a B gain value at the center of the light guide plate 320, the distance d between the light source array 125*b* and the light guide plate 320, and the thermal conductivity ε of the light guide plate 320. These values except the distance d between the light source array 125*b* and the light guide plate 320 may be set when the light guide plate 320 is designed.

The color temperature compensation unit 150 may determine, either by calculating or some other technique, a difference in color temperature between each position Y of the light guide plate 320 and the center of the light guide plate 320 using these values (S500). Then, the color temperature compensation unit 150 may determine, either by calculating or some other technique, an R gain compensation value and/or a B gain compensation value, which are color temperature compensation values, using the difference in color temperature (S510).

The color temperature compensation unit 150 may store the calculated color temperature compensation values about each position Y of the light guide plate 320 in the look-up table 155 to be matched to information about each position Y of the light guide plate 320 and information about a position of a pixel in the display panel 110.

When image data are input to the timing controller 140, the color temperature compensation unit 150 may transfer to the timing controller 140 a color temperature compensation value for each pixel in the display panel 110, where the color temperature compensation value may be stored in the look-up table 155. It may also be sent to the timing controller 140 (S520).

The timing controller 140 may correct an R gain value and/or a B gain value of the image data to be applied to one or more of the pixels based at least in part on the R gain compensation value and/or the B gain compensation value which are color temperature compensation values, and then provide the corrected image data to the source driver (S530).

The timing controller 140 may correct the image data used to drive a pixel corresponding to a reddish area of the light guide plate 320 so as to decrease the R gain, and/or to correct the image data used to drive a pixel corresponding to a greenish area of the light guide plate 320 so as to increase the R gain and the B gain.

As such, in the present exemplary embodiment, a color temperature compensation value at each position of the light guide plate 320 may be determined, either by calculating or some other technique, using information about a color temperature at the center of the light guide plate 320, an R gain value and a B gain value at the center of the light guide plate 320, the distance d between the light source array 125$b$ and the light guide plate 320, and the thermal conductivity $\varepsilon$ of the light guide plate 320. Herein, all of the values used for calculating a color temperature compensation value may be set when the light guide plate 320 is designed and assembled. Therefore, it is not necessary to find out a color temperature compensation value by measuring a color temperature of each display panel. In the present exemplary embodiment, it is possible to calculate, or determine by some other technique, a color temperature compensation value using the previously known values. Thus, it is possible to simplify a process of determining, either by calculating or some other technique, a color temperature compensation value and compensating a color temperature. Further, in the present exemplary embodiment, it is possible to remove reddish and greenish phenomena using only an R gain and a B gain. Thus, it is not necessary to adjust a G gain. Therefore, it is possible to suppress loss caused by a change in luminance conventionally occurring when a color temperature is compensated.

In some implementations, the light source array 125$b$ is disposed along a transverse direction of the light guide plate 320 such that greenish and reddish phenomena may occur above and under the center along a longitudinal direction of the light guide plate 320. However, the light source array 125$b$ may be disposed along a longitudinal direction of the light guide plate 320 such that greenish and reddish phenomena may occur on the left and the right sides of the center along a transverse direction of the light guide plate 320. In this case, a position of the light guide plate 320 is changed to a direction X instead of the direction Y, and then, a color temperature compensation value can be calculated, or otherwise determined by the same method.

The features, structures, effects, and the like, described in the above exemplary embodiments are included in at least one exemplary embodiment and but are not limited to one exemplary embodiment. In addition, the features, structures, effects, and the like, described in the respective exemplary embodiments may be executed by those skilled in the art while being combined or modified with respect to other embodiments. Accordingly, it will be understood that contents related the combination and modification will be included in the scope of the present disclosure.

Further, it will be understood that the exemplary embodiments described above should be considered in a descriptive sense only and not for purposes of limitation. It will be understood by those skilled in the art that various other modifications and applications may be made therein without departing from the spirit and scope of the exemplary embodiments. For example, respective components illustrated in detail in the exemplary embodiments may be executed while being modified. Also, it should be construed that differences related to the modification and application are included in the scope of the present disclosure as defined by the following claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device, comprising:
   a liquid crystal display panel that includes a plurality of pixels;
   a light guide plate that includes a plurality of positions and that transmits light from a light source to the liquid crystal display panel, the light guide plate having a thermal conductivity and a reference position;
   a color temperature compensation unit configured to determine a color temperature at one or more positions of the light guide plate using the thermal conductivity of the light guide plate and a color temperature at the reference position of the light guide plate, and determine a color temperature compensation value at each of the one or more positions of the light guide plate based at least in part on the color temperature; and
   a timing controller configured to correct at least one of an R gain value or a B gain value of image data displayed in at least one of the plurality of pixels based at least in part on the color temperature compensation value;
   wherein the at least one of the R gain value or the B gain value is differently corrected according to a distance of each of the one or more positions of light guide plate spaced apart from the light source.

2. The display device according to claim 1, wherein the color temperature compensation unit determines the color temperature compensation value to increase the R gain value and the B gain value in an area of the light guide plate where the color temperature is higher than the reference position, and the color temperature compensation unit calculates the color temperature compensation value to decrease the R gain value in an area of the light guide plate where the color temperature is lower than the reference position.

3. The display device according to claim 1, wherein the color temperature compensation unit determines the color temperature compensation value by reflecting a change of the color temperature based at least in part on a distance between the light guide plate and the light source.

4. The display device according to claim 1, wherein the color temperature compensation unit is configured to determine the color temperature at one or more positions of the light guide plate by performing one or more calculations based at least in part on the thermal conductivity of the light guide plate and the color temperature at the reference position.

5. The display device according to claim 1, wherein the color temperature compensation unit is configured to determine the color temperature compensation value at each of the one or more positions of the light guide plate by performing one or more calculations based at least in part on the color temperature.

6. The display device according to claim 5, wherein the one or more calculations to determine the color temperature compensation value at each of the one or more positions are based at least in part on a distance from the reference position to each respective one of the one or more positions.

7. The display device according to claim 1 further comprising:
one or more optical sheets that are disposed on a top surface of the light guide plate.

8. The display device according to claim 7, wherein the one or more optical sheets include at least one diffusion sheet that disperses light incident from the light guide plate.

9. The display device according to claim 7, wherein the one or more optical sheets include an upper prism sheet and a lower prism sheet that distribute light on the liquid crystal display panel.

10. A data compensating method of a display device, the method comprising:
determining a color temperature at each position of a light guide plate using a thermal conductivity of the light guide plate that transmits light from a light source to a liquid crystal display panel and a color temperature at a reference position of the light guide plate;
determining a color temperature compensation value at one or more positions of the light guide plate using a difference in color temperature between the reference position and each of the one or more positions; and
correcting at least one of an R gain value or a B gain value of image data displayed in at least one of the plurality of pixels based at least in part on the color temperature compensation value;
wherein the at least one of the R gain value or the B gain value is differently corrected according to a distance of each of the one or more positions of light guide plate spaced apart from the light source.

11. The method of claim 10, wherein correcting includes, for a pixel corresponding to an area of the light guide plate where the color temperature is higher than the reference position, increasing the R gain value and the B gain value, and for a pixel corresponding to an area of the light guide plate where the color temperature is lower than the reference position, decreasing the R gain value.

12. The method of claim 10, wherein determining includes changing the color temperature based at least in part on a distance between the light guide plate and the light source is reflected.

13. The method of claim 10, wherein determining the color temperature at each position of the light guide plate further comprises performing one or more calculations based at least in part on the thermal conductivity of the light guide plate and the color temperature at the reference position.

14. The method of claim 10, wherein determining a color temperature compensation value at one or more positions further comprises performing one or more calculations based at least in part on the color temperature.

15. The method of claim 14, wherein the one or more calculations are based at least in part on a distance from the reference position to each respective one of the one or more positions.

16. The method of claim 10 further comprising:
dispersing light incident from the light guide plate using at least one diffusion sheet.

17. The method of claim 10 further comprising:
distributing light on the liquid crystal display panel using at least one of an upper prism sheet and a lower prism sheet.

18. A display device, comprising:
a liquid crystal display panel that includes a plurality of pixels;
a light guide plate that includes a plurality of positions and that transmits light from a light source to the liquid crystal display panel, the light guide plate having a thermal conductivity and a reference position;
a color temperature compensation unit configured to determine a color temperature at one or more positions of the light guide plate using the thermal conductivity of the light guide plate and a color temperature at the reference position of the light guide plate, and determine a color temperature compensation value at each of the one or more positions of the light guide plate based at least in part on the color temperature; and
a timing controller configured to correct at least one of an R gain value and a B gain value of image data displayed in at least one of the plurality of pixels based at least in part on the color temperature compensation value; and
wherein the color temperature compensation unit determines the color temperature compensation value to increase the R gain value and the B gain value in an area of the light guide plate where the color temperature is higher than the reference position, and the color temperature compensation unit calculates the color temperature compensation value to decrease the R gain value in an area of the light guide plate where the color temperature is lower than the reference position.

* * * * *